United States Patent
Shin et al.

(10) Patent No.: US 9,880,584 B2
(45) Date of Patent: Jan. 30, 2018

(54) METHOD AND APPARATUS FOR EXECUTING APPLICATION IN DEVICE

(71) Applicant: Samsung Electronics Co. Ltd., Suwon-si, Gyeonggi-do (KR)

(72) Inventors: Hang-sik Shin, Yongin-si (KR); Jae-woo Ko, Uiwang-si (KR); Se-jun Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/975,790

(22) Filed: Aug. 26, 2013

(65) Prior Publication Data
US 2014/0075056 A1    Mar. 13, 2014

(30) Foreign Application Priority Data
Sep. 10, 2012  (KR) .......................... 10-2012-0099738

(51) Int. Cl.
*G06F 1/16* (2006.01)
*H04L 29/08* (2006.01)

(52) U.S. Cl.
CPC ............ *G06F 1/1615* (2013.01); *H04L 67/10* (2013.01); *H04L 67/303* (2013.01)

(58) Field of Classification Search
CPC .... G06F 1/1615; G06F 9/3885; G06F 15/177; H04L 67/10; H04L 67/303
USPC .......................................................... 710/20
See application file for complete search history.

(56) References Cited

U.S. PATENT DOCUMENTS

| | | | |
|---|---|---|---|
| 7,184,848 B2 | 2/2007 | Krzyzanowski et al. | |
| 8,190,749 B1 | 5/2012 | Chi et al. | |
| 2004/0003073 A1* | 1/2004 | Krzyzanowski et al. | .... 709/223 |
| 2006/0101054 A1* | 5/2006 | Dempski | ................. G06F 9/542 |
| 2006/0168178 A1* | 7/2006 | Hwang | ............... H04L 12/2803 709/223 |
| 2008/0077713 A1* | 3/2008 | Kim et al. | ........................ 710/9 |
| 2011/0119673 A1* | 5/2011 | Bloch | ..................... G06F 9/546 718/102 |
| 2011/0130173 A1* | 6/2011 | Im et al. | ....................... 455/567 |
| 2012/0050183 A1 | 3/2012 | Lee | |
| 2012/0155468 A1 | 6/2012 | Greenberg et al. | |
| 2013/0014040 A1* | 1/2013 | Jagannathan et al. | ........ 715/765 |
| 2013/0085705 A1* | 4/2013 | Jano | .................... H04M 1/0208 702/127 |

FOREIGN PATENT DOCUMENTS

| | | |
|---|---|---|
| CN | 1759386 A | 4/2006 |
| EP | 2353677 A2 | 8/2011 |
| KR | 10-2001-0110400 A | 12/2001 |
| WO | 2005-121959 A2 | 12/2005 |

* cited by examiner

Primary Examiner — Henry Tsai
Assistant Examiner — John Roche
(74) Attorney, Agent, or Firm — Jefferson IP Law LLP

(57) ABSTRACT

Provided are a method and a device for executing an application, in which a second external device is communication-connected while the device executes the application along with a first external device and the device executes the application along with the first device and the second external device based on characteristic information of the first external device and the second external device. Also, in the method of executing an application, one or more external devices are connected while a device executes the application and the device and the one or more external devices execute the application together.

32 Claims, 12 Drawing Sheets

FIG. 8

| DEVICE | INDEX NUMBER | MICROPHONE | SPEAKER | SCREEN | TOUCH SCREEN | GYRO SENSOR | CAMERA LENS | DEFAULT SETTING VALUE |
|---|---|---|---|---|---|---|---|---|
| CONTROLLER APPCESSORY FOR RACING GAME | 0 | X | X | X | X | O | X | INPUT DEVICE |
| SMART TV | 1 | X | O | O | O | X | X | OUTPUT DEVICE |
| SMART PHONE | 2 | O | O | O | O | O | O | INPUT DEVICE |
| GUN APPCESSORY FOR SHOOTING GAME | 3 | O | O | X | X | O | X | INPUT DEVICE |
| DIGITAL CAMERA | 4 | O | O | O | O | X | O | INPUT DEVICE |

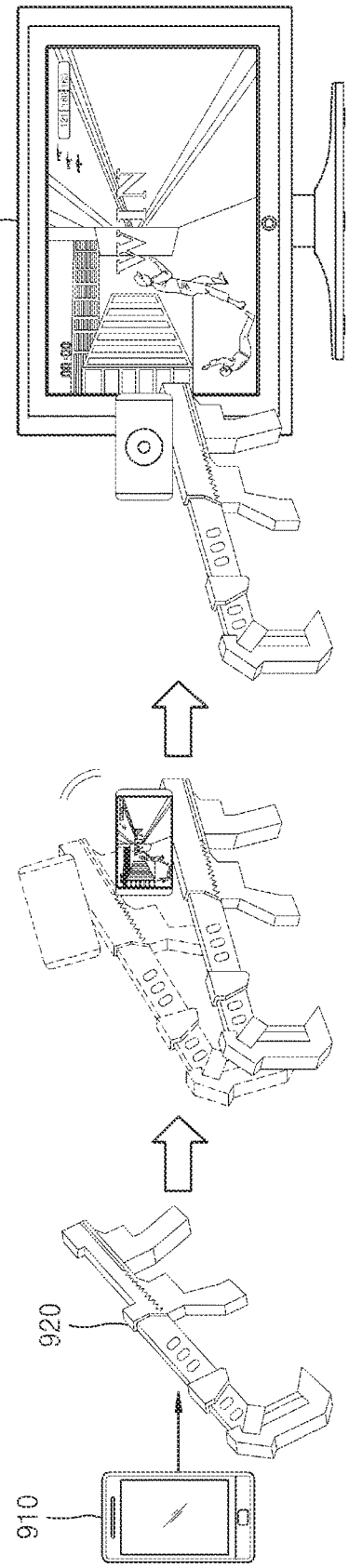

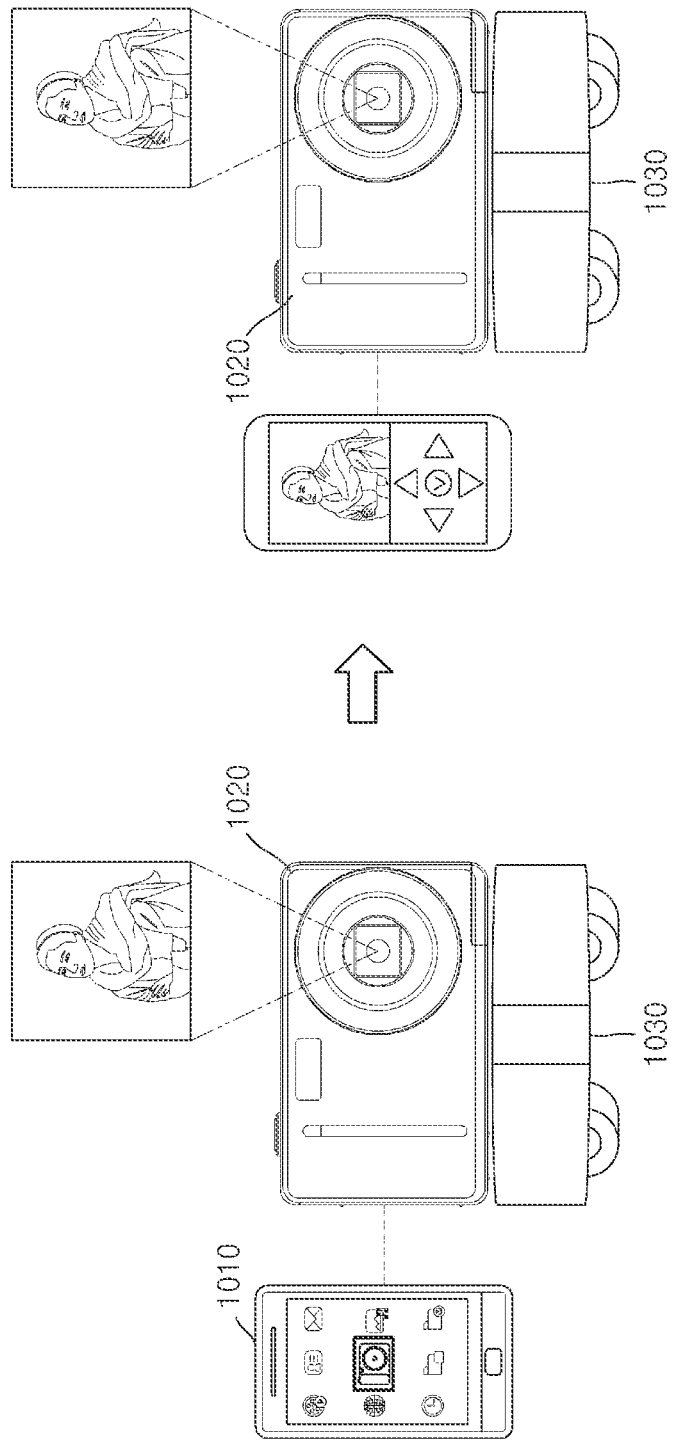

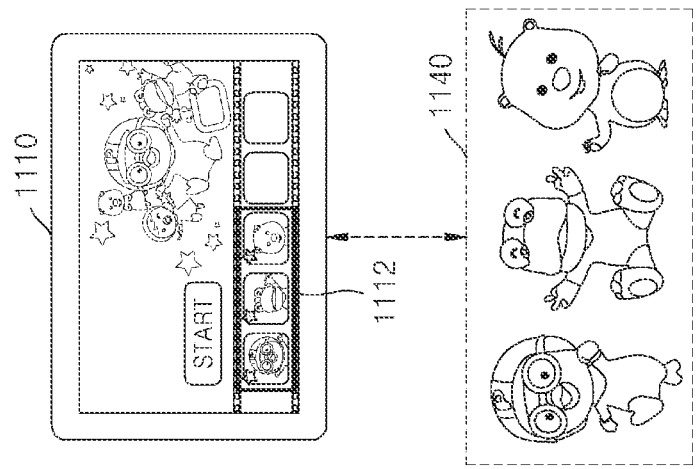
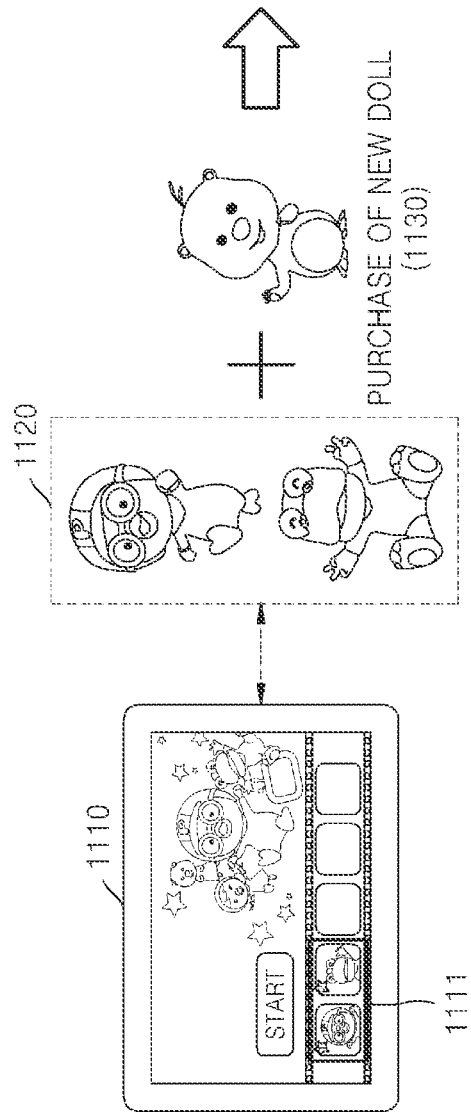

METHOD AND APPARATUS FOR EXECUTING APPLICATION IN DEVICE

CROSS-REFERENCE TO RELATED APPLICATION(S)

This application claims the benefit under 35 U.S.C. § 119(a) of a Korean patent application filed on Sep. 10, 2012 in the Korean Intellectual Property Office and assigned Ser. No. 10-2012-0099738, the entire disclosure of which is hereby incorporated by reference.

TECHNICAL FIELD

The present disclosure relates to a method and apparatus for executing an application in a device. More particularly, the present disclosure relates to a method and apparatus for executing an application along with at least one external device that is connected to a device by, when the at least one external device is changed, changing an application in the device, a function of the application, and a service provided by the device.

BACKGROUND

As a device has higher performance, the device is connected to external devices around the device. In particular, as hardware and communication technology have been developed, a device may be connected to one or more external devices.

Also, a device provides various types of services or functions to a user by executing an application. Furthermore, a device may execute an application while being connected to and interacting with one or more external devices.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for executing an application by reflecting a case where a device or its environment is changed, for example, a case where a new external device is connected to the device or a connection between the device and the external device is terminated.

In accordance with an aspect of the present disclosure, a method performed by a device to execute an application is provided. The method includes executing the application along with a first external device that is connected to the device, communication-connecting a second external device during the execution of the application, and executing the application along with the first external device and the second external device based on characteristic information of the first external device and the second external device.

The communication-connecting of the second external device may include searching for the second external device during the execution of the application, and communication-connecting the found second external device.

The method may further include determining whether the connected second external device is capable of executing the application, wherein the executing of the application along with the first external device and the second external device includes executing the application based on a result of the determination.

The characteristic information of the first external device and the second external device may be obtained from each of the first external device and the second external device.

The characteristic information may include at least one information about whether each of the first external device and the second external device supports an input device, whether each of the first external device and the second external device supports an output device, a screen size, a basic setting value of the input/output device, a category, and a device IDentifier (ID).

The executing of the application based on the characteristic information may include dividing a plurality of functions provided by the application to the device, the first external device, and the second external device based on the characteristic information.

The executing of the device along with the first external device and the second external device may include: setting at least one of the device, the first external device, and the second external device as an input device of the application, and setting at least one of the device, the first external device, and the second external device as an output device of the application.

The input device and the output device may be set based on the characteristic information of the first external device and the second external device.

The method may further include searching for a new application that is capable of being executed by the device, the first external device, and the second external device, as the second external device is communication-connected.

The executing of the application along with the first external device and the second external device may include executing the found new application along with the first external device and the second external device.

The executing of the application along with the first external device and the second external device may include executing an application selected by a user input from among the application that is being executed and the new application.

The executing of the application along with the first external device and the second external device may include: determining whether the new application is installed in the first external device and the second external device, and transmitting download information of the new application to a device in which the new application is not installed from among the first external device and the second external device.

The executing of the application along with the first external device and the second external device may include: determining whether the new application is installed in the device, and when it is determined that the new application is not installed in the device, downloading the new application.

The downloading of the new application may include downloading download information of the new application which is received from the first external device or the second external device.

The executing of the application along with the first external device and the second external device may include executing the application based on at least one of the device and the first external device to which the second external device is communication-connected.

In accordance with another aspect of the present disclosure, a method performed by a first external device to execute an application is provided. The method includes communication-connecting a device that executes the application along with a second external device, and as the device is communication-connected, executing the application along with the second external device and the device, wherein the application is executed in the first external device based on characteristic information of the first external device and the second external device.

In accordance with another aspect of the present disclosure, a device for executing an application is provided. The device includes a control unit that executes the application along with a first external device that is connected to the device, and a device management unit that communication-connects a second external device during the execution of the application, wherein the control unit executes the application along with the first external device and the second external device based on characteristic information of the first external device and the second external device.

In accordance with another aspect of the present disclosure, a first external device for executing an application is provided. The first external device includes a device management unit that communication-connects a device that executes the application along with a second external device, and a control unit that, as the device is communication-connected, executes the application along with the second external device and the device, wherein the application is executed in the first external device based on characteristic information of the first external device and the second external device.

In accordance with another aspect of the present disclosure, a method of executing an application is provided. The method includes executing the application along with a first external device that is connected to a device, wherein the executing is performed by the device, being communication-connected to at least one of the device and the first external device during the execution of the application, wherein the being communication-connected is performed by a second external device, and executing the application based on characteristic information of the first external device and the second external device, wherein the executing is performed by the device, the first external device, and the second external device.

In accordance with another aspect of the present disclosure, a non-transitory computer-readable recording medium having embodied thereon a program for executing any of the methods described above is provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 is a table for explaining characteristic information according to an embodiment of the present disclosure;

FIGS. 10A, 10B, and 10C are views for explaining a method of executing an application according to another embodiment of the present disclosure;

FIGS. 11A and 11B are views for explaining a method of executing an application according to another embodiment of the present disclosure;

FIGS. 12A and 12B are views for explaining a method of executing an application according to another embodiment of the present disclosure;

Throughout the drawings, it should be noted that like reference numbers are used to depict the same or similar elements, features, and structures.

DETAILED DESCRIPTION

Figure 1:
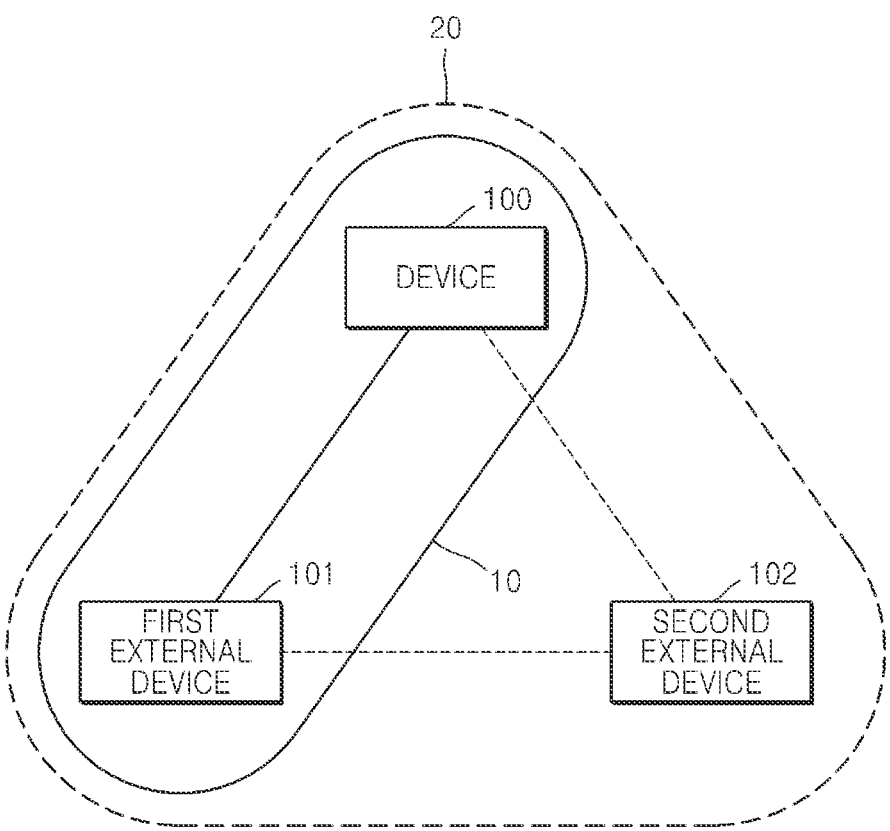
FIG. 1 is a block diagram illustrating a system for executing an application according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the term "and/or" includes any and all combinations of one or more of the associated listed items.

Expressions such as "at least one of," when preceding a list of elements, modify the entire list of elements and do not modify the individual elements of the list.

Most of the terms used herein are general terms that have been widely used in the technical art to which the present disclosure pertains. However, some of the terms used herein may be created reflecting intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present disclosure.

In the present specification, it should be understood that the terms, such as 'including' or 'having', are intended to indicate the existence of the elements disclosed in the specification, and are not intended to preclude the possibility that one or more other elements may exist or may be added. Also, the terms, such as 'unit' or 'module', should be understood as a unit that processes at least one function or operation and that may be embodied in a hardware manner, a software manner, or a combination of the hardware manner and the software manner.

The present disclosure will now be described more fully with reference to the accompanying drawings, in which various embodiments of the disclosure are shown.

FIG. 1 is a block diagram illustrating a system for executing an application according to an embodiment of the present disclosure.

Referring to FIG. 1, the system may include a device 100 and a first external device 101. Also, the system may further include a second external device 102 that is capable of being connected to the device 100, in addition to the first external device 101 that is connected to the device 100, as shown by a dashed line in FIG. 1.

The term "application" used herein may refer to a program that may be executed in the device 100, the first external device 101, and the second external device 102, and may be visually confirmed by a user. Furthermore, the application may include not only a program executed in the device 100 but also a service operating in the background of the device 100. That is, although not displayed on a screen of the device 100, the application may refer to various types of services or functions provided to the user through the device 100.

The device 100 and the first external device 101 of FIG. 1 are communication-connected to each other to execute an application. That is, when an application executed in the device 100 is an application executed with both the device 100 and the first external device 101, the device 100 and the first external device 101 are communication-connected (10) in a wireless or wired manner. In other words, the device 100 and the first external device 101 are connected to each other to execute the application.

For example, when the device 100 and the first external device 101 are different smartphones, the device 100 and the first external device 101 may execute a game application that transmits and receives data in real time. In this case, the device 100 and the first external device 101 are connected to each other in a wireless or wired manner to execute the game application together.

Next, a case where the second external device 102 is newly connected and thus an external device connected to the device 100 is changed is shown. That is, the second external device 102 is connected to at least one of the device 100 and the first external device 101 (20). By contrast, in a state where the second external device 102 is connected to the device 100 and the first external device 101, the connection of the second external device 102 may be terminated.

As shown in FIG. 1, the number of external devices connected to the device 100 may be increased or reduced, and the device 100 may execute an application based on a connection relationship with external devices, types of the external devices, and the number of external devices.

For example, assuming that there is a game application that transmits and receives data between the device 100 and the first external device 101, an image of the game application may be displayed when a TeleVision (TV) in addition to two smartphones is connected. In this case, the TV is connected as the second external device 102 to at least one of the device 100 and the first external device 101. Next, the device 100 may change and execute the application according to external devices connected to the device 100 by outputting the image of the game application to the TV.

Not only when a new external device is connected to the device 100 but also when functions of external devices that are previously connected to the device 100 are changed, a service provided by the device 100 may be changed. Furthermore, even when the device 100 is connected to a web server or a cloud server instead of an external device, a service provided by the device 100 may be changed.

For example, assuming that the device 100, the first external device 101, and the second external device 102 execute a game application together, the second external device 102 may be used as an input device. In this case, according to an external output to use the second external device 102 as an output device, the device 100 may change a service (that is, the game application) to use the second external device 102 as an input device.

As another example, when a web server (not shown) is connected while the device 100 and the first external device 101 execute a game application, a real-time game mode may be executed through a network. That is, a factor that changes a service provided by the device 100 is not limited to a connection between the device 100 and an external device.

The terms "host device" and "appcessory device" will be explained. First, the term "appcessory device" refers to a device that is incapable of independently executing an application (alone) from among one or more devices that execute the application together. That is, the appcessory device has to be connected to another device to execute an application. Accordingly, the appcessory device is dependent on an application and another device. The term "host device" refers to a device that is capable of independently executing an application without being connected to another device, unlike the appcessory.

However, the term "host device" and the term "appcessory device" are not limited thereto, and may vary according to an application which the device 100 executes. The term "host device" and the term "appcessory device" are determined according to a dependence on a device and an application. Hence, in various cases where a connection relationship between devices is changed, for example, when a new external device is connected to the device 100, a connection of a device that is previously connected is terminated, or an executed application is changed, a function of the same device may change from a host function to an appcessory function, or from an appcessory function to a host function. That is, when an application or a service executed or provided by the device 100 is changed, a host device may change into an appcessory device, or an appcessory device may change into a host device.

Considering that an appcessory device may not independently execute an application, at least one of the device 100 and the first external device 101 which are connected to execute an application is a host device. Assuming that there is a blood pressure measurement application that is a medical application, a smartphone in which an application is executed and a blood pressure monitor that measures a blood pressure by being attached to a body part may be connected to each other to execute the blood pressure measurement application. In this case, the smartphone acts as a host device, and the blood pressure monitor acts as an appcessory device. That is, the smartphone functions as a host device that receives a measurement result from the blood pressure monitor, outputs the measurement result to the user, and controls the blood pressure measurement application, and the blood pressure monitor functions as an appcessory device that measures a blood pressure of an object according to a control signal received from the smartphone and transmits a result of the measurement to the smartphone.

The device 100 may be connected in a wireless or wired manner to external devices. When the device 100 is connected in a wireless manner, one or more devices may be connected through various technologies such as Wi-Fi, Bluetooth Low Energy (BLE), Near Field Communication (NFC), and Radio Frequency IDentification (RFID). When one or more devices are connected in a wired manner, various types of methods using a High-Definition Multimedia Interface (HDMI) cable, a Red, Green, Blue (RGB) cable, or a socket may be used.

Figure 2:
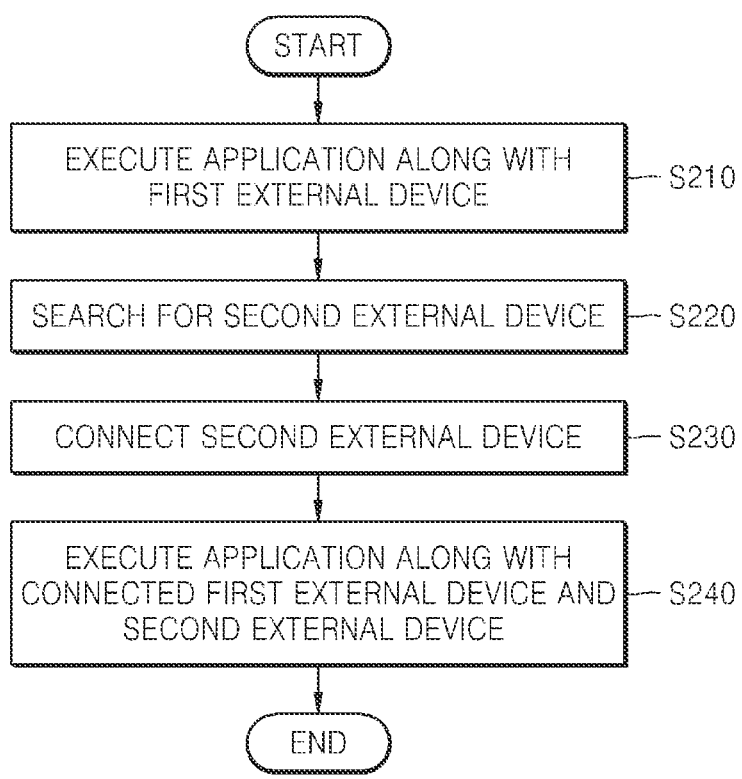
FIG. 2 is a flowchart illustrating a method of executing an application according to an embodiment of the present disclosure.

FIG. 2 is a flowchart illustrating a method of executing an application according to an embodiment of the present disclosure. FIG. 2 is a flowchart for explaining operations sequentially performed by the device 100 that executes an application.

In operation S210, the device 100 executes an application along with the first external device 101. That is, the device 100 executes the application by being connected to the first external device 101. When the device 100 is a host device that executes the application, the first external device 101 may act as a host device that independently executes the application, or an appcessory device that executes the application along with the device 100.

In operation S220, the device 100 searches for the second external device 102. That is, the device 100 searches for a new external device that is connected in a wireless or wired manner to the device 100, in addition to the first external device 101. Operation S220 may be performed by the device 100 during the execution of the application performed in operation S210. That is, the device 100 may search for a new external device while executing the application along with the first external device 101.

The searching for the new external device may be actively performed by the device 100, or may be passively performed by the device 100, for example, by receiving a connection signal from the new external device.

Also, the device 100 may search for a device within a communication range of the device 100 by using BLE, whereas the device 100 may search for a new device according to a connection signal physically received by the device 100. That is, a process performed by the device 100 to search for a new device is not limited thereto, and various short/long distance communication technologies may be used.

In operation S230, the device 100 is connected to the found second external device 102. That is, the device 100 may search for a new device to recognize the second external device 102, and may be communication-connected to the second external device 102.

Alternatively, after the device 100 recognizes the second external device 102 and performs an authentication process on the second external device 102, the second external device 102 may be connected to the device 100. That is, when the second external device 102 that may be connected to the device 100 is searched for but it is found that the second external device 102 is a device that is incapable of being connected to the device 100, the found second external device 102 may not be connected to the device 100.

Although the second external device 102 that is a new device is connected to the device 100 as described above, the second external device 102 may be connected to the first external device 101. That is, when a communication range of the device 100 and a communication range of the first external device 101 are different from each other, the device 100 may determine a new device found by the first external device 101 as the second external device 102, and may determine whether the second external device 102 is connected to the first external device 101. In other words, in order to execute the application, the second external device 102 may be connected to at least one of the device 100 and the first external device 101.

In operation S240, the device 100 executes the application along with the second external device 102 and the first external device 101 connected to the device 100. That is, according to a changed connection relationship, the device 100 may change and provide an application, content of a service, or a function. In other words, in operation S240, the device 100 executes the application along with external devices connected to the device 100 by reflecting a connection relationship.

When "an application is changed", it may mean that not only an application that is executed in the device 100 is physically changed but also content of a service or a function provided by the device 100 is changed in the same application. That is, in operation S240, as an additional external device is connected, the device 100 may newly distribute functions of the application to external devices, or may perform an additional function included in the same application.

As described above with reference to FIG. 2, as the second external device 102, in addition to the first external device 101, is connected to the device 100, the device 100 executes an application along with the first and second external devices 101 and 102. The device 100 may execute an application based on characteristic information of an external device which will be explained below with reference to FIGS. 5 through 7.

Figure 3:
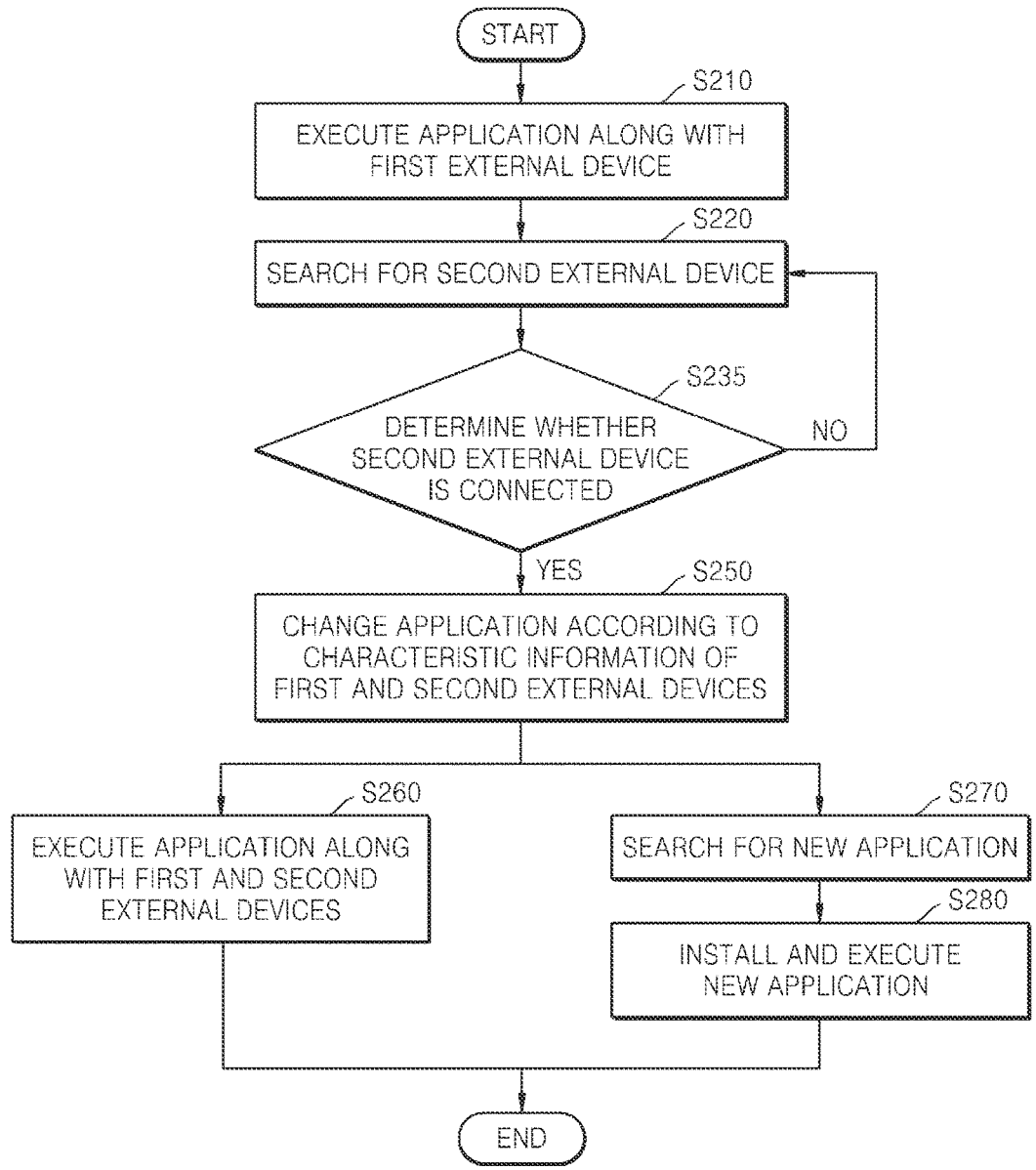
FIG. 3 is a flowchart illustrating a method of executing an application according to another embodiment of the present disclosure.

FIG. 3 is a flowchart illustrating a method of executing an application according to another embodiment of the present disclosure. Operations S210 and S220 in FIG. 3 are the same as those in FIG. 2, and thus a repeated explanation thereof will not be given.

In operation S235, the device 100 determines whether the second external device 102 searched for in operation S220 is connected. When it is determined in operation S235 that the second external device 102 is connected, the method proceeds to operation S250. Otherwise, when it is determined in operation S235 that the second external device 102 is not connected, the method returns to operation S220. Examples of a case where the second external device 102 is not connected may include a case where the device 100 fails to authenticate the second external device 102 and a case where the second external device 102 is incapable of executing the application which the device 100 is to execute.

In operation S250, the device 100 changes the application according to characteristic information of the first external device 101 and the second external device 102. The term "characteristic information" refers to hardware information of a device related to execution of an application. In other words, characteristic information of a device may refer to various information utilized to use the device as an input device or an output device when an application is executed. The characteristic information may be received from an external device when the external device is connected to the device 100.

For example, characteristic information may include various information related to a device, for example, information about whether the device supports an input device, whether the device supports an output device, whether the device includes a screen, and a screen size of the device (when the device includes the screen). Also, characteristic information may include information about whether an external device is a host device or an appcessory device. Furthermore, characteristic information may include category information (for example, information about for which device the external device is used from among a smartphone, a TV, and an application.)

The device 100 may receive device IDentifiers (IDs) of the second external device 102 and the first external device 101 connected to the device 100, and may confirm characteristic information of an external device that is previously stored in the device 100 by using the device IDs. Next, the device 100 may change the application by using the confirmed characteristic information.

Also, when the application is changed in operation S250, it may mean that a service provided by the device 100 is changed, for example, the application itself is changed as described above, or content or an additional function of the application is executed. In operation S250, the device 100 may change the application based on the received characteristic information. That is, the device 100 may change and execute the application in order to provide a type or a function of an application supported by an external device.

In operation S260, the device 100 executes the application along with the first external device 101 and the second external device 102. That is, the device 100 may execute the application along with external devices by using the characteristic information.

In operation S270, the device 100 searches for a new application. That is, the device 100 searches for a new application that may be executed along with the first external device 101 and the second external device 102. Information about the new application may be received from the second external device 102 when the second external device 102 is connected to the device 100.

In operation S270, the device 100 may search for an application by using characteristic information of the second external device 102. That is, when information about an application which the second external device 102 supports is included in the characteristic information (for example, when the second external device 102 is an appcessory device for a specific application), the device 100 may search for a new application by obtaining from the characteristic information the information about the application which the second external device 102 that is newly connected to the device 100 supports.

For example, when the second external device 102 is an appcessory device, the appcessory device is a device used with a specific application. Accordingly, the second external device 102 may include information about a new application (e.g., when the second external device 102 is an appcessory device for a game, information about a game application and download information of the game application) different from the application that is being currently executed in the device 100 and the first external device 101 in the characteristic information and may transmit the characteristic information including the information about the new application to the device 100. Next, the device 100 searches for the new application by using the received information about the new application.

In operation S280, the device 100 installs and executes the new application. When the found new application is already installed in the device 100, the device 100 may immediately execute the new application along with the second external device 102.

Also, in operation S280, the device 100 may transmit to the first external device 101 that is another external device the information about the new application received from the second external device 102. Accordingly, the first external device 101 may install the new application, and may execute the new application along with the device 100 and the second external device 102. Operations S270 and S280 will be further explained below with reference to FIG. 4.

When the new application is incapable of being executed in the device 100 or the first external device 101 that is connected to the device 100, the device 100 may output an error message indicating that the new application is incapable of being executed. The error message may be output by using any of various methods, such as an additional pop-up window or an alarm sound.

According to the method of FIG. 3, the device 100 may adaptively execute an application according to a change in an environment in which the application is executed due to a device newly connected to the device 100. That is, as a connection relationship between the device 100 and an external device is changed, the device 100 may change a service of an application that is being executed and may provide a new service, or may change and execute the application itself.

Although only a case where an external device is connected has been described, a case where a connection of an external device is terminated may be considered. That is, as a connection of the second external device 102 to the device 100 of FIG. 1 is terminated, the device 100 may change and provide content of an application that is being executed, or may execute a new application that is capable of being executed along with the first external device 101.

Figure 4:
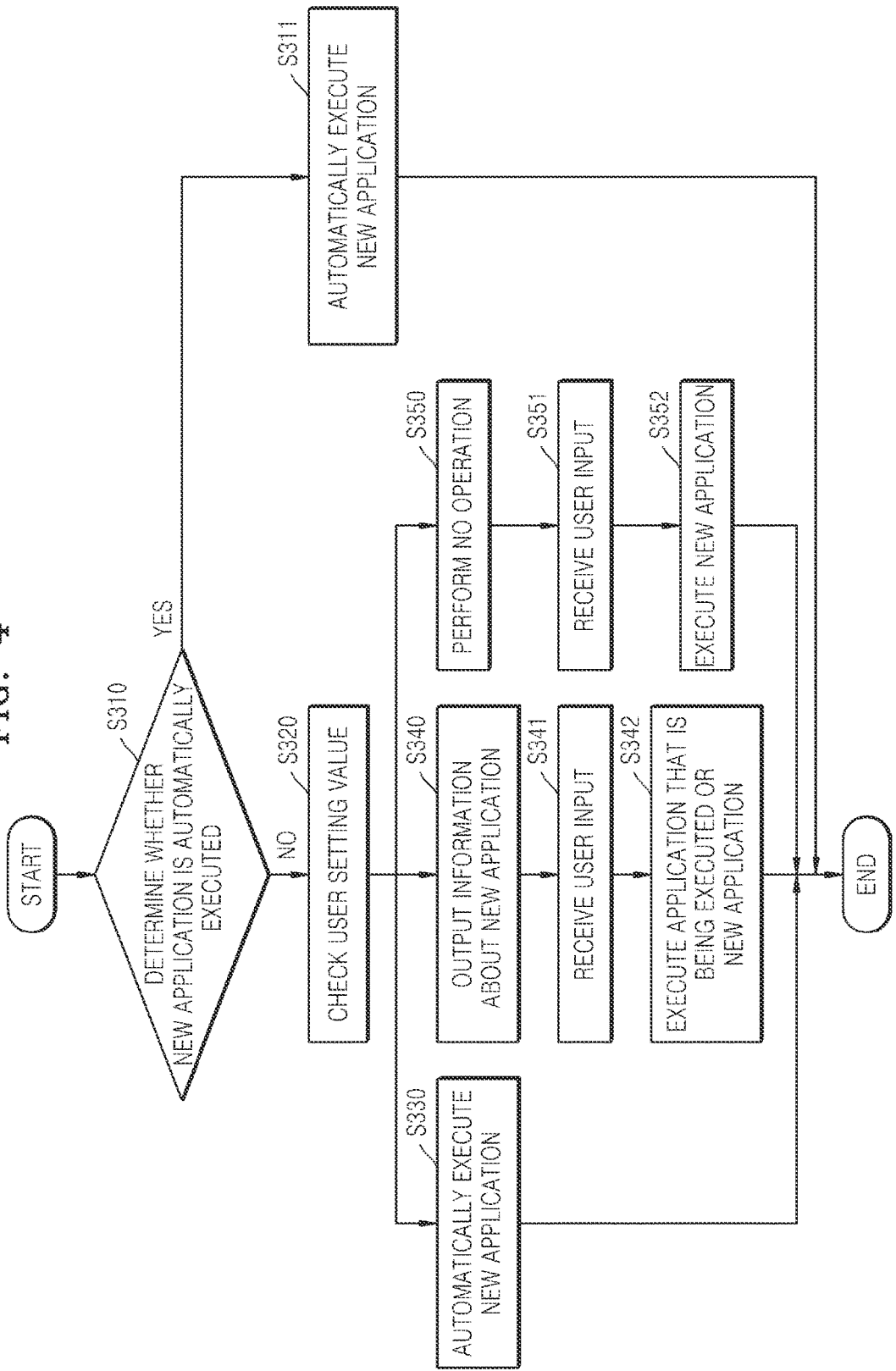
FIG. 4 is a flowchart illustrating a method of executing an application according to another embodiment of the present disclosure.

FIG. 4 is a flowchart illustrating a method of executing an application according to another embodiment of the present disclosure. Operations after operation S270 of FIG. 3 will be explained in detail with reference to FIG. 4.

In operation S310, the device 100 determines whether the found new application is automatically executed. When it is determined in operation S310 that the found new application is automatically executed, the method proceeds to operation S311. Otherwise, when it is determined in operation S310 that the found new application is not automatically executed, the method proceeds to operation S320.

In operation S311, the device 100 automatically executes the new application. That is, when the found new application is an application that may be executed without an application launching command, the device 100 automatically executes the new application without an external input signal.

When the new application is not an application that is automatically executed, in operation S320, the device 100 checks a user setting value that is previously stored. That is, the device 100 may previously store various setting values for a case where a new application is found. For example, the device 100 may be set to output to the user that a new application has been found, or may be set not to perform any additional operation until a user input is received.

In operation S330, when the user setting value is previously stored to automatically execute a new application, the device 100 automatically executes the found new application.

In operation S340, when the user setting value is previously stored to output that a new application has been found, the device 100 outputs information about the new application.

That is, the device 100 informs the user that the new application may be executed. The device 100 may output information about the new application by using an application list including at least one application that is capable of being executed along with an external device. Alternatively, the device 100 may output a message to select whether the new application is to be executed or the application that is being executed is to be continuously executed.

The device 100 may output the information about the new application by using at least one of text, graphics, and sound. That is, the device 100 may output the information about the new application to the user by using any of various methods including, for example, a method of outputting an application list or a message as described above.

When the second external device 102 that is newly connected to the device 100 is a host device, there may exist a plurality of applications that are capable of being executed as the second external device 102 is added, unlike when the second external device 102 is an appcessory device. Accordingly, the device 100 may output information about new applications that are capable of being executed, and may enable the user to select a desired application.

In operation S341, the device 100 receives a user input. The user input received by the device 100 may be a user input that selects that the new application is to be executed, or a user input that selects that the application that is being executed is to be continuously executed.

In operation S342, the device 100 continuously executes the application that is being executed or executes the new application based on the received user input. That is, the device 100 may enable the user to execute a desired application.

In operation S350, when the user setting value is previously stored not to perform any additional operation even when a new application is found, the device 100 does not perform any operation on the new application. That is, the device 100 continuously executes the application that is being executed until a command to execute the new application is received according to an external input signal.

In operation S351, the device 100 receives a user input to execute the new application. In operation S352, the device 100 executes the new application based on the received user input. When the user input is not received, the device 100 waits without executing the found new application.

According to the method of FIG. 4, the device 100 may perform various operations on a found new application according to a user setting value that is previously stored.

Figure 5:
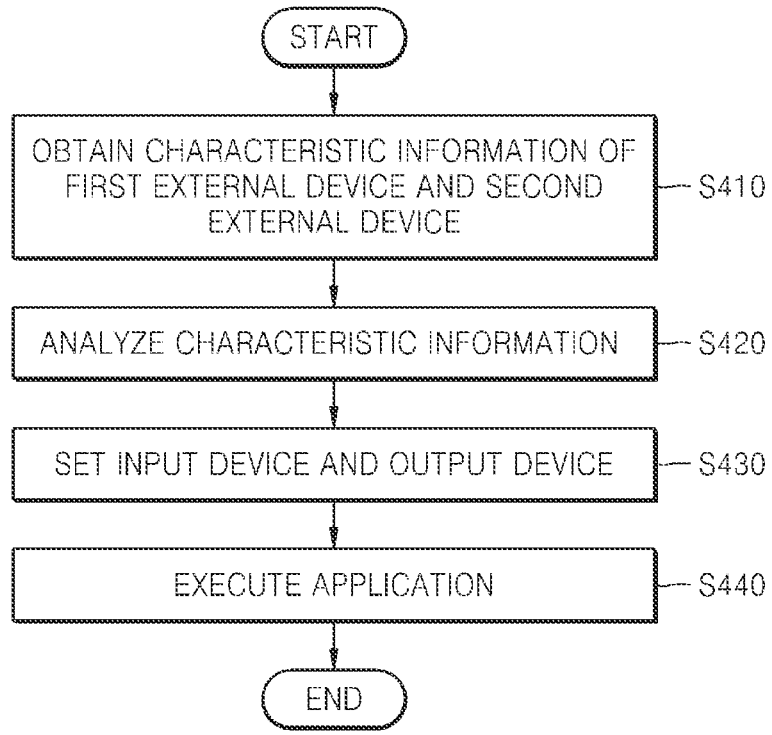
FIG. 5 is a flowchart illustrating a method of executing an application according to another embodiment of the present disclosure.
Figure 6:
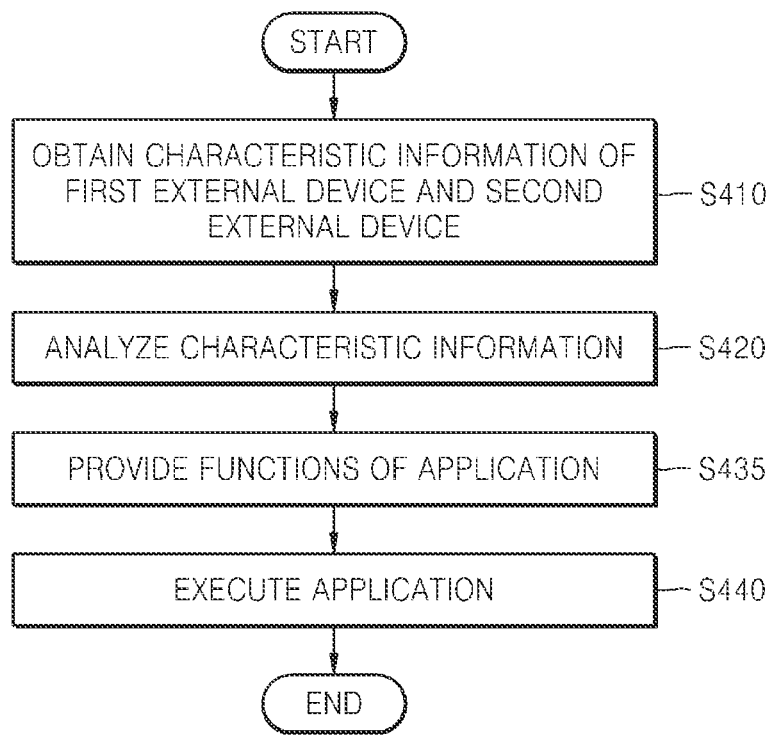
FIG. 6 is a flowchart illustrating a method of executing an application according to another embodiment of the present disclosure.

FIGS. 5 and 6 are flowcharts illustrating methods of executing an application according to various embodiments of the present disclosure. FIGS. 5 and 6 are flowcharts for explaining other methods performed by the device 100 to execute an application.

In operation S410, the device 100 obtains characteristic information of the first external device 101 and the second external device 102. As described above with reference to FIG. 2, the term "characteristic information" may refer to hardware information of an external device related to execution of an application, and may include various information related to the external device, for example, information about whether the external device supports an input device, whether the external device supports an output device, whether the external device includes a screen, and a screen size of the external device (when the external device includes the screen). Also, the characteristic information may include information about whether the external device is a host device or an appcessory device, and category information of the external device.

The device 100 may obtain characteristic information of an external device whenever each external device is connected to the device 100. That is, the device 100 may obtain characteristic information of the first external device 101 to execute an application along with the first external device 101, and may obtain characteristic information of the second external device 102 when the second external device 102 is newly found and connected to the device 100. Furthermore, when a third external device (not shown) is connected to the device 100, the device 100 may additionally obtain characteristic information of the third external device.

When it is determined that the external device is a device that has already connected to the device 100, the device 100 may use characteristic information that is previously stored instead of obtaining characteristic information of the external device. That is, when an external device that is additionally connected to the device 100 is a device that has been connected to the device 100 before, the device 100 may use characteristic information that is previously stored, and may not obtain the characteristic information again. Information about whether a device that is newly connected has been connected before may be included in connection information received by the device 100 when the external device is connected to the device 100. Alternatively, whether an external device that is newly connected has been connected before may be determined by using connection information received when the device 100 authenticates the external device.

The term "connection information" refers to information that is used to perform a connection setup before the device 100 transmits and receives data to and from an external device. That is, the connection information may include various information for establishing data communication between the device 100 and the external device, for example, protocol information of a device, information about a communication performance of the device, or information about a data modulation/demodulation method. In other words, the device 100 may receive connection information from an external device, and may establish communication with the external device before executing an application and transmitting and receiving data.

Also, as the device 100 obtains the characteristic information of the first external device 101 and the second external device 102, a short distance network technology, such as Wi-Fi or Bluetooth, may be used. That is, the device 100 may use a short distance network technology, such as BLE or NFC, in a process of searching for an external device and being connected to the external device, and may use another short distance network technology, such as Wi-Fi or Bluetooth, in a process of transmitting and receiving data to and from the external device and executing an application together.

In operation S420, the device 100 analyzes the characteristic information obtained from a device that is connected to the device 100. The device 100 may change content of a service according to a type of an application and a type of a device that is connected to the device 100, when executing the application along with the first external device 101 and the second external device 102, as described above. That is, the device 100 may differently set an input device and an output device of the application. Accordingly, the device 100 may analyze the characteristic information obtained in operation S410 to set an external device connected to the device 100 as an input device and/or an output device of the application.

For example, the device 100 may extract, from the characteristic information, information about whether the first external device 101 may operate as an input device, or may extract, from the characteristic information, information about whether the second external device 102 may operate as an output device. Alternatively, the device 100 may obtain, from the characteristic information, information about whether a device connected to the device 100 includes a screen on which an image is to be output.

In operation S430, the device 100 sets an input device and an output device for executing the application. The characteristic information received by the device 100 may include information about each external device that supports an input device and an output device. Also, the characteristic information may include a basic setting value for the input/output device of each external device. That is, the device 100 sets the external device that is connected to the device 100 as an input device and/or an output device of the application by using the characteristic information analyzed in operation S420.

For example, when the characteristic information received by the first external device 101 includes information indicating that the first external device 101 operates as an audio output device for an application, the device 100 may obtain information about the audio output device by analyzing the characteristic information. Next, the device 100 may set the first external device 101 as an audio output device of the application.

There may exist a plurality of input devices and output devices for the application. Also, the device 100 may set one external device as both an input device and an output device for the same application. Operations S420 and S430 will be explained further below in additional detail with reference to FIG. 8.

In operation S440, the device 100 executes the application along with the first external device 101 and the second external device 102. That is, the device 100 may execute the application along with the first external device 101 and the second external device 102 by using the input device and the output device set in operation S430.

According to an embodiment, the device 100 may execute the application by setting the first external device 101 as an input device of the application and setting the second external device 102 as an output device of the application. Alternatively, as described above, the device 100 may set each of the first external device 101 and the second external device 102 as both an input device and an output device of the application.

According to the method of FIG. 4, and according to types and the number of external devices connected to the device 100, the same application may be executed by using different input/output devices. For example, when a device connected to the device 100 includes a screen on which an image is to be output, the device may be used as an output device of the application, and when the device does not include a screen, the device may be used as an input device of the application, which will be explained further below in additional detail with reference to FIGS. 9A through 12B.

FIG. 6 is a flowchart illustrating a method of executing an application according to another embodiment of the present disclosure. Operations S410 and S420 are the same as those in FIG. 5 and thus a repeated explanation thereof will not be given.

In operation S435, the device 100 distributes functions of the application based on the characteristic information of the first external device 101 and the second external device 102. That is, the device 100 distributes a plurality of functions of the application that is executed in the device 100 to external devices that are connected to the device 100.

For example, when the characteristic information of the first external device 101 includes information indicating that the first external device 101 may operate as an output device, the device 100 may provide an audio output function of the application to the first external device 101.

In operation S440, the device 100 executes the application along with each external device by using the functions of the application that are distributed to the first external device 101 and the second external device 102. Although two devices are connected to the device 100 in the description with reference to FIGS. 4 and 5, the present embodiment is not limited thereto, and a plurality of external devices may be connected to the device 100. That is, unlike in FIGS. 2 through 5, three or more external devices may be connected to the device 100.

The following will be explained on the assumption that a music player application is executed in the device 100. The music player application may support a song play function, a music video playback function, and a karaoke function.

According to the present embodiment, a smart TV that executes the music player application may be connected as the first external device 101 to the device 100. The device 100 may receive characteristic information indicating that a screen on which an image is to be output is included from the smart TV that is the first external device 101. Next, the device 100 may execute the music player application by using the analyzed characteristic information. In detail, the device 100 may control the smart TV to reproduce on the screen of the smart TV a music video of a song that is being played in the device 100. In other words, the device 100 provides a music video playback function of the music player application to the smart TV.

A microphone may be connected as the second external device 102 that is an appcessory device related to the music player application to the device 100. The device 100 may receive characteristic information from the microphone that is connected to the device 100, and may distribute a singing room function of the music player application to the microphone. In this case, the device 100 may enable the smart TV to output lyrics of the song along with the music video.

Figure 7:
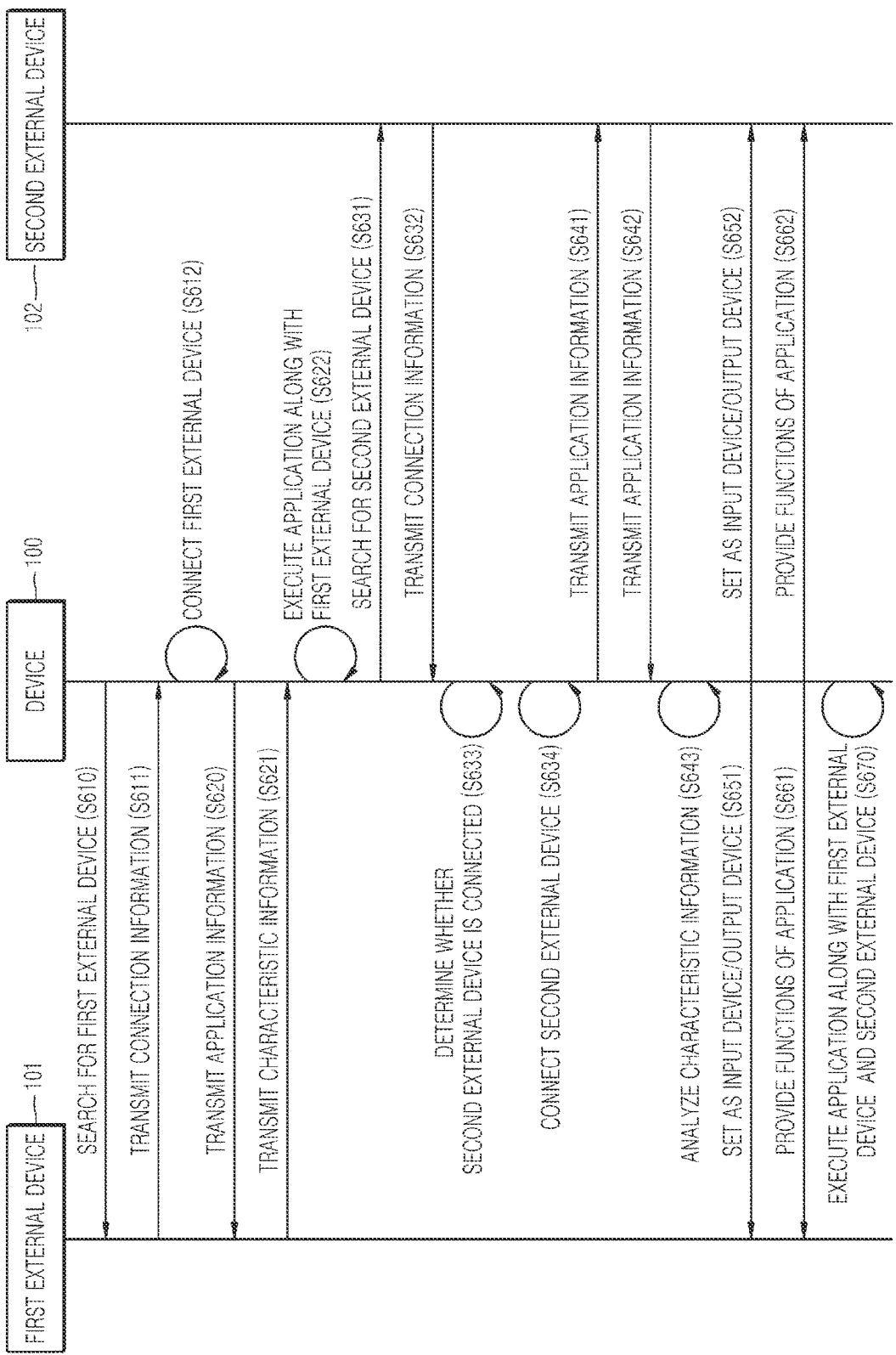
FIG. 7 is a flowchart illustrating a method performed by a device to execute an application along with a first external device and a second external device according to an embodiment of the present disclosure.

FIG. 7 is a flowchart illustrating a method performed by the device 100 to execute an application according to an embodiment of the present disclosure.

In operation S610, the device 100 searches for the first external device 101. As described above with reference to FIG. 2, the device 100 may search for the first external device 101 by using a short distance network technology, such as BLE. The device 100 may actively search for the first external device 101, or may passively search for the first external device 101 by using a short distance network technology, such as NFC.

In operation S611, the first external device 101 transmits connection information to the device 100. That is, when a search signal is received from the device 100 by the first external device 101 in operation S610, the first external device 101 transmits connection information in response to the search signal in operation S611. The connection information transmitted by the first external device 101 may include various information, such as network information for transmitting and receiving data between the device 100 and the first external device 101 and authentication information of the first external device 101.

When a short distance network technology, such as NFC, is used, operation S610 may be omitted. That is, the device 100 and the first external device 101 may start to communicate with each other when the first external device 101 transmits the connection information to the device 100.

In operation S612, the device 100 is communication-connected to the first external device 101. In operation S612, the device 100 may further perform a process of authenticating the first external device 101 to execute an application together. That is, the device 100 may authenticate the first external device 101 by using the received connection information, and may be connected to the first external device 101 when it is determined that the first external device 101 is a reliable device.

In operation S620, the device 100 transmits application information to the first external device 101. That is, the application information may include information about the application executed in the device 100 according to an external input signal. That is, when the device 100 and the first external device 101 are connected to each other and a command to launch the application is received from the user by the device 100, the device 100 transmits information about the application that is to be executed to the first external device 101.

When the first external device 101 is an appcessory device for the application that is executed in the device 100, the application may be previously installed in the first external device 101. That is, since an appcessory device is a device that is dependent upon an application, the first external device 101 may be connected to the device 100 in a state where the application executed in the device 100 is already installed in the first external device 101.

When the first external device 101 is a host device, the first external device 101 may be connected to the device 100 in a state where the application executed in the device 100 is not installed in the first external device 101. For example, when both the device 100 and the first external device 101 are smartphones, an application executed in the device 100 may not be installed in the first external device 101. Accordingly, the application information transmitted by the device 100 to the first external device 101 may include download information (e.g., Uniform Resource Locator (URL) information) of the application. The first external device 101 may determine whether the application is installed by using the received application information, and when it is determined that the application is not installed, may download and install the application according to the download information of the application.

Although the application information is transmitted to the first external device 101 and the first external device 101 executes a predetermined application by using the application information in operation S620, the present embodiment is not limited thereto. In an embodiment, operation S620 may be omitted, and the device 100 may receive characteristic information from the first external device 101 irrespective of the application. Alternatively, even when the device 100 is connected to the first external device 101 while independently previously executing the application, operation S620 may be omitted.

In operation S621, the first external device 101 transmits the characteristic information to the device 100. That is, the first external device 101 transmits the characteristic information including information about a basic setting value of an input device or an output device of the first external device 101, whether a screen is included, and a screen size when the screen is included in the device 100.

In operation S622, the device 100 executes the application along with the first external device 101 by using the received characteristic information. That is, the device 100 transmits and receives data to and from the first external device 101 and executes the application along with the first external device 101. A process performed by the device 100 to set the first external device 101 as an input device or an output device will be explained in additional detail further below with reference to operations S651 through S662.

In operation S631, the device 100 searches for the second external device 102 while executing the application along with the first external device 101. That is, the device 100 searches for a new device, separately from the execution of the application. Here, the searching for the new device may be performed continuously.

In operation S632, the second external device 101 found by the device 100 transmits connection information to the device 100. Operation S632 is the same as that described in operation S611 and thus a detailed description of operation S632 is omitted herein.

In operation S633, the device 100 determines whether to be connected to the second external device 102. That is, the device 100 outputs a message indicating that the second external device 102 is connected while executing the application along with the first external device 101, and determines whether to be connected to the second external device 102 as an external device that is to execute the application together. Whether to be connected to the second external device 102 may be determined according to a user input which the device 100 receives.

In operation S634, the device 100 is communication-connected to the second external device 102. That is, the device 100 is connected to the second external device 102 that is a new external device, in addition to the first external device 101. Although the second external device 102 is connected to the device 100 in FIG. 6, the second external device 102 may be connected to the first external device 101 or may be connected to both the device 100 and the first external device 101, as described with reference to FIG. 1.

In operations S641 and S642, the device 100 transmits the application information about the application that is being executed to the second external device 102, and obtains characteristic information from the second external device 102, like in operations S620 and S621.

In operations S643 through S662, another embodiment of operation S622 will be described in detail. In operation S643, the device 100 analyzes the characteristic information of the second external device 102. That is, the device 100 analyzes the characteristic information including various information of the second external device 102 to execute the application that is being executed along with the second external device 102.

In operations S651 and S652, the device 100 sets each of the first external device 101 and the second external device 102 as an input device or an output device. That is, the device 100 sets each of external devices connected to the device 100 as an input device or an output device for executing the application.

In operations S661 and S662, the device 100 distributes functions of the application to the first external device 101 and the second external device 102. That is, the device 100 distributes one or more functions of the application that is being executed to external devices that are connected to the device 100. The device 100 may distribute functions of the application by using the received characteristic information of the devices.

In operation S670, the device 100 executes the application along with the first external device 101 and the second external device 102. That is, the device 100 distributes functions of the application to the first external device 101 and the second external device 102, sets each device as an input device or an output device, and executes the application.

FIG. 7 is just one of various embodiments, and the number of external devices connected to the device 100 is not limited to two (i.e., the first external device 101 and the second external device 102). Also, unlike in FIG. 7, a case where a connection between the device 100 and a device such as the second external device 102 is terminated is within the scope of the present disclosure.

FIG. 8 is a table for explaining characteristic information according to an embodiment of the present disclosure.

The device 100 may receive characteristic information from at least one external device connected to the device 100. As described with reference to FIG. 2, the characteristic information may include category information of an external device and a device ID, in addition to various information related to the device, such as information about whether the device supports an input device, whether the device supports an output device, whether the device includes a screen, and a screen size of the device (when the device includes the screen). Referring to FIG. 8, five devices connected to the device 100 indicate characteristic information about whether the devices support various types of input/output devices by using index numbers.

The following explanation will focus on a smart TV from among the five devices. The smart TV includes a speaker and a screen as an output device and includes a touch screen as an input device. Also, the smart TV is basically set as an output device. Characteristic information of the smart TV is indicated by an 'index number 1'. That is, when the device 100 receives from the smart TV the 'index number 1' as characteristic information, the device 100 may obtain information about whether the smart TV supports an input/output device. Accordingly, the device 100 may analyze the received characteristic information of the smart TV, and may set the smart TV as an input device or an output device of the application.

When the device 100 executes a game application along with the first external device 101 that is a smartphone, the second external device 102 that is a smart TV may be connected. The device 100 may analyze characteristic information of the smart TV, and may set the smart TV as an image output device and an audio output device of the game application.

Accordingly, the device 100 may receive characteristic information indicated by an index number from each external device, analyze the received characteristic information, and may set each external device connected to the device 100 as an input device or an output device of the application.

FIG. 8 exemplarily shows characteristic information. An index number indicating characteristic information may be expressed in various ways according to a combination of an input device and an output device. Also, various input devices and output devices of FIG. 8 are also exemplarily shown, and characteristic information may include information about whether to support various types of devices other than the devices shown in FIG. 8.

Furthermore, although not shown in FIG. 8, characteristic information may include a device ID and category information as described above.

Figure 9C:
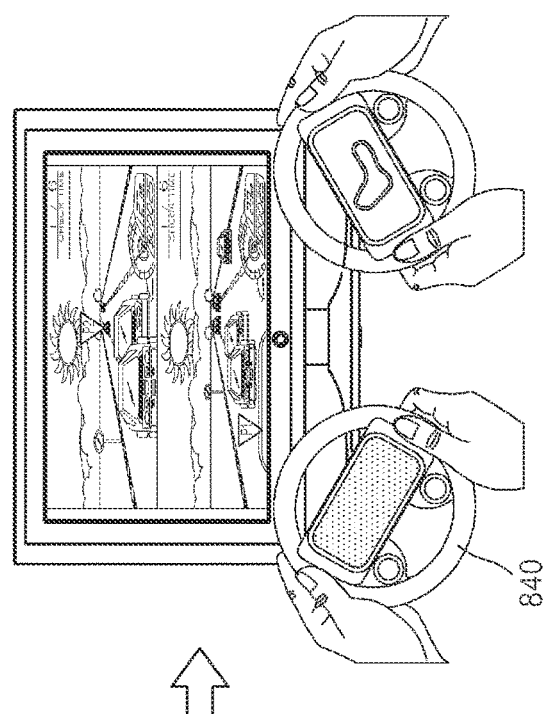
FIGS. 9A, 9B, and 9C are views for explaining a method of executing an application according to another embodiment of the present disclosure.
Figure 9B:
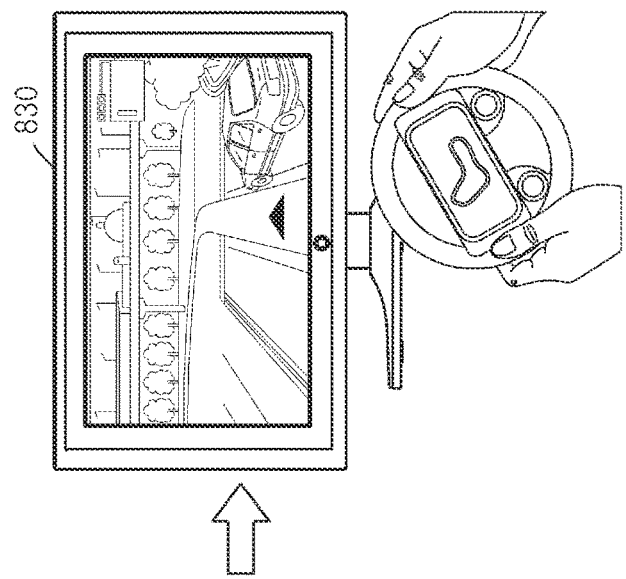
Figure 9A:
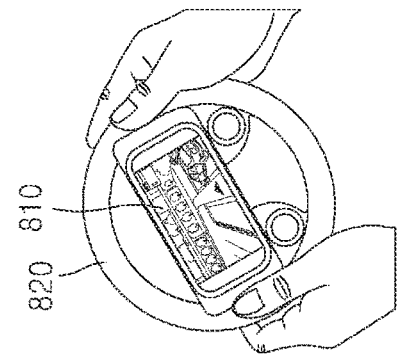

FIGS. 9A through 9C are views for explaining a method of executing an application according to another embodiment of the present disclosure. FIGS. 9A through 9C are views for explaining a process of executing a racing game application in a device 810.

In FIG. 9A, a first external device 820 that is an appcessory device for a racing game is connected to the device 810 that is a host device (e.g., a smartphone). That is, the device 810 and the first external device 820 are communication-connected to each other to execute the racing game application. The first external device 820 that is a controller used to execute the racing game application is an appcessory device that has no screen on which an image is to be output and thus may not independently execute the racing game application.

In FIG. 9A, the first external device 820 that is an appcessory device operates as an input device of the racing game application, and the device 810 that is a host device having a screen operates as an output device of the racing game application. The first external device 820 that is an appcessory device may include a gyro sensor that measures an angular velocity of a device. In this case, when the device 810 is connected to the first external device 820, the device 810 may obtain characteristic information indicating that the gyro sensor is included from the first external device 820, may analyze the characteristic information, and may set the first external device 820 as an input device.

In FIG. 9B, the device 810 and the first external device 820 are connected to a second external device 830 that is another host device (e.g., a smart TV). That is, the device 810 searches for and is connected to the second external device 830 while executing the racing game application along with the first external device 820. The device 810 may authenticate the second external device 830 by using connection information received from the second external device 830, and then when the second external device 830 is authenticated, may be connected to the second external device 830.

In FIG. 9B, the second external device 830 that is newly connected to the device 810 is a host device that may independently execute the racing game application. Accordingly, the racing game application may be executed by two host devices (i.e., the device 810 and the second external device 830) and one appcessory device (i.e., the first external device 820) in FIG. 9B.

When the second external device 830 is connected to the device 810, the device 810 may analyze characteristic information received from the second external device 830, and may set the second external device 830 as an output device. That is, the second external device 830 that is a smart TV may include a screen having a size greater than that of the device 810, and a basic setting value for an input/output device and information about a screen size of the second external device 830 may be included in the characteristic information of the second external device 830. The device 810 may determine from the characteristic information of the second external device 830 that the screen of the second external device 830 is larger than that of the device 810, and may set the second external device 830 as an output device of the racing game application. The device 810 may operate as an auxiliary output device that outputs a map of the racing game application by using the screen included in the device 810.

In FIG. 9B, the device 810 may be connected to the second external device 830 in which the racing game application is not installed. In order for the device 810 to execute the racing game application that is being executed along with the second external device 830, it is used to install the racing game application in the second external device 830. Accordingly, the device 810 may transmit download information of the racing game information and racing game application information of the racing game application that is being currently executed to the second external device 830.

Next, the second external device 830 receives the racing game application information, and determines whether the racing game application is installed in the second external device 830. When the racing game application is not installed in the second external device 830, the second external device 830 analyzes the download information received along with the application information, and downloads the racing game application. The download information may include a web page address through which the racing game application may be purchased or a URL address through which the racing game application may be directly downloaded.

Unlike in FIG. 9B, the second external device 830 may not execute the racing game application. That is, when the second external device 830 is an appcessory device (e.g., a microphone) that is not related to the racing game, the device 810 may output an error message.

In FIG. 9C, the device 810 is connected to a third external device 840 that is a new appcessory device. The third external device 840 is an appcessory device for a racing game, like the first external device 820. When the third external device 840 is connected, two host devices (i.e., the device 810 and the second external device 830) and two appcessory devices (i.e., the first external device 820 and the third external device 840) are connected to execute the application together. Since the third external device 840 does not include a screen on which an image is to be output, the third external device 840 operates as a controller for a racing game that is an input device.

In FIG. 9C, as the third external device 840, which is a new input device, is connected, the device 810 may control the second external device 830 that is an output device to divide a game image into two images and output the two images. That is, the device 810 may process application data input by the first external device 820 and the third external device 840, and may control the second external device 830 to display all of the processed application data on the screen of the second external device 830. Unlike in FIG. 9C, the second external device 830 may divide a game image into left and right images, and may output the left and right images of the racing game application.

FIGS. 10A through 10C are views for explaining a method of executing an application according to another embodiment of the present disclosure. FIGS. 10A through 10C are views for explaining a process performed by a device 910 to execute a shooting game application.

In FIG. 10A, the device 910 that is a host device is connected in a wired or wireless manner to a first external device 920 that is an appcessory device. That is, the device 910 may recognize the first external device 920 by using a short distance network technology, such as BLE or NFC, and may be connected to the first external device 920 by using a network technology, such as Wi-Fi or Bluetooth. Alternatively, the device 910 may be connected to the first external device 920 in a wired manner by using a communication cable or a pin connector.

Since the first external device 920 is an appcessory device that is dependent upon the shooting game application in FIG. 10A, the first external device 920 may be connected to the device 910 in a state where the shooting game application is previously installed. In an embodiment, the device 910 may be connected to the first external device 920 in a state where the shooting game application is not installed in the device 910. In the present embodiment, the device 910 may download the shooting game application by using download information of the shooting game application that is included in characteristic information received from the first external device 920.

In FIG. 10B, the device 910 executes the shooting game application along with the first external device 920. The first external device 920 that is an appcessory device for the shooting game application may include characteristic information indicating that the first external device 920 is basically set as an input/output device. The device 910 may obtain the characteristic information of the first external device 920, and may set the first external device 920 as an input device of the shooting game application. The device 910 may operate as an output device that outputs onto a screen input data of the shooting game application received through the first external device 920.

In FIG. 10C, the device 910 is connected to a second external device 930 that is a new host device. The second external device 930 that is a smart TV includes a screen having a size greater than that of the device 910. Accordingly, the device 910 may set the second external device 930 as an output device of the shooting game application. The device 910 may operate as an auxiliary output device that displays on the screen of the device 910 a radar or a map displayed on the shooting game application.

When the shooting game application is not installed in the second external device 930 that is a host device, the device 910 may transmit download information of the shooting game application to the second external device 930, and the second external device 930 may download and install the shooting game application.

In FIGS. 9A through 10C, as a new external device is connected to the devices 810 and 910, content of a service and a function of an application (e.g., a racing game application or a shooting game application) that is being executed are changed. That is, content of the same application provided to the user is changed as an external device connected to the devices 810 and 910 is changed.

FIGS. 11A and 11B are views for explaining a method of executing a new application as an external device is added according to another embodiment of the present disclosure. FIGS. 11A and 11B are views for explaining a method of executing an application according to another embodiment of the present disclosure.

FIGS. 11A and 11B are views for explaining a method of executing a remote control application for capturing an image in a device 1010.

In FIGS. 11A and 11B, the device 1010 is a smartphone, a first external device 1020 is a digital camera, and a second external device 1030 is a camera dock device that is an appcessory device. The smartphone and the digital camera may be host devices or appcessory devices.

In FIG. 11A, the first external device 1020 captures an image by being connected to the second external device 1030. That is, the second external device 1030 automatically moves and executes a party shot application by being connected to the first external device 1020. The term "party shot application" refers to an application in which a digital camera automatically moves in a predetermined place and automatically captures an image by recognizing laughs and smiles of people.

In the party shot application, the first external device 1020 that is a digital camera acts as a host device, and the second external device 1030 that is a camera dock device acts as an appcessory device. Also, the device 1010 that is a smartphone is not yet connected to the first external device 1020 and the second external device 1030 and waits on a main screen.

In FIG. 11A, the first external device 1020 receives and analyzes characteristic information of the second external device 1030, and executes the party shot application together. When the party shot application is not installed in the first external device 1020, the first external device 1020 may obtain download information of the party shot application by using the characteristic information received from the second external device 1030, and may install the party shot application.

In FIG. 11B, the device 1010 is connected to the first external device 1020. Next, the device 1010 executes a remote control application that is a new application along with the first external device 1020 and the second external device 1030. Also, the first external device 1020 is still executing the party shot application along with the second external device 1030.

As described above with reference to FIG. 2, the remote control application that is a new application may be executed right after the device 1010 is connected to the first external device 1020 and the second external device 1030, or may be executed according to a user input after information of the remote control application is output to the user.

In FIG. 11B, when a user input to vertically and horizontally move the second external device 1030 is received, the device 1010 moves the second external device 1030 that is a camera dock device by remotely controlling the second external device 1030. Also, when a user input to capture an image is received, the device 1010 may stop the movement of the second external device 1030, and may capture an image by controlling the first external device 1020.

As described above with reference to FIGS. 11A and 11B, the device 1010 may search for and execute a new application as a new device is connected. Unlike in FIGS. 11A and 11B, when a connection of the camera dock device is terminated, the device 1010 may execute only a shutter function for capturing an image in the remote control application that is being executed. That is, the device 1010 may execute the application by changing a service provided in the application that is being executed according to a connection relationship between the device 1010 and an external device.

FIGS. 12A and 12B are views for explaining a method of executing an application according to another embodiment of the present disclosure. FIGS. 12A and 12B are views for explaining a method of executing an animation application in a device 1110.

In FIG. 12A, the device 1110 executes the animation application while being connected to two first external devices 1120. That is, the first external devices 1120 that are talking doll devices connected to the device 1110 are appcessory devices that reproduce sound when an image is reproduced or move according to the image.

For example, the user purchases the talking doll devices and makes the device 1110 recognize the talking doll devices. When the animation application is not previously installed, the device 1110 receives characteristic information from the talking doll devices, and downloads and installs the animation application. Next, the device 1110 may display on a screen information about the two first external devices 1120 recognized by the device 1110 (1111).

In FIG. 12A, the user purchases a second external device 1130 that is another talking doll device, and connects the second external device 1130 to the device 1110. Next, the device 1110 may recognize and authenticate the second external device 1130. Since the first external devices 1120 and the second external device 1130 that are talking doll devices include speakers, the first external devices 1120 and the second external device 1130 may operate as an audio output device, and since the device 1110 includes a touch screen, the device 1110 may operate as both an image input device and an image output device.

In FIG. 12B, the device 1110 may display on the screen the second external device 1130 that is newly connected to the device 1110 (1112). In FIG. 12A, the device 1110 may execute an animation in which two talking doll devices appear. In FIG. 12B, the device 1110 may execute an animation in which three talking doll devices appear. In other words, when a new device is connected to the device 1110, the device 1110 may dynamically change content provided through the application.

Furthermore, in FIG. 12B, the device 1110 may download an animation in which three talking doll devices appear as the second external device 1130 is connected. That is, the device 1110 may add a service provided in an application or may provide a new function according to a relationship between the device 1110 and external devices 1140 connected to the device 1110.

Figure 13:
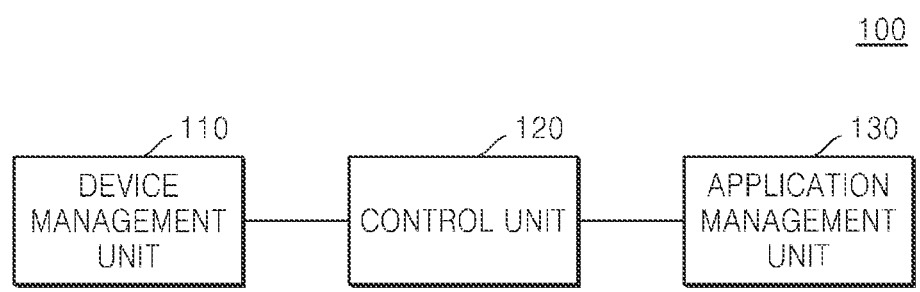
FIG. 13 is a block diagram illustrating the device for executing an application according to an embodiment of the present disclosure.

FIG. 13 is a block diagram illustrating the device 100 for executing an application according to an embodiment of the present disclosure. Referring to FIG. 13, the device 100 may include a device management unit 110, a control unit 120, and an application management unit 130.

The device 100 is a device that executes an application alone or along with one or more external devices connected to the device 100. For example, although the device 100 is a smartphone herein, the device 100 may be any of various devices for executing an application, such as a mobile terminal, a smart TV, a computer, a laptop, a Personal Digital Assistant (PDA), a Portable Multimedia Player (PMP), a tablet Personal Computer (PC), or a Consumer Electronics (CE) device.

The device 100 may execute various applications. For example, the device 100 may reproduce various types of applications, such as a moving image content-related application (e.g., a TV broadcasting application, a Video-On-Demand (VOD) application, a User-Created Content (UCC) application, a music video application, or a YouTube application), a still image-related application (e.g., a photograph application or a drawing application), a text-related application (e.g., an electronic book (a poem or a novel) application, a letter application, a work file application, or a web page application), a music-related application (e.g., a music reproduction or a radio broadcasting application), a game application (e.g., a racing game application or a shooting game application), and a phone application (e.g., a voice calling application or a video calling application).

The device management unit 110 manages one or more external devices connected to the device 100. That is, the device management unit 110 may connect a new external device to the device 100, and may terminate a connection of an external device that is already connected to the device 100. That is, the device management unit 110 may manage an external device connected to the device 100 in order to execute an application.

Also, the device management unit 110 may search for a new external device that is connected to the device 100. For example, the device management unit 110 may search for an external device close to the device 100 by using a short distance network technology by using a device search module (not shown). The short distance network technology may be any of various technologies such as BLE, NFC, Wi-Fi, Bluetooth, ZigBee, Wi-Fi Direct (WFD), Ultra Wideband (UWB), or Infrared Data Association (IrDA).

As described above with reference to FIG. 2, the device management unit 110 may actively search for a new device by directly transmitting a connection signal to an external device, or may passively search for a new device by using a connection signal received from an external device.

Also, the device management unit 110 analyzes characteristic information received from an external device. That is, the device management unit 110 may analyze characteristic information of an external device that is connected to the device 100 in order to set an input/output device of the application or to distribute functions of the application. As described above with reference to FIG. 2, the characteristic information of the external device may include various types of information related to a specification of the external device, and various information, such as information about whether the external device is a host device or an appcessory device, category information of the external device, and a device ID of the external device.

Furthermore, the device management unit 110 sets at least one external device connected to the device 100 as an input device and/or an output device of the application that is executed in the device 100. That is, the device management unit 110 may analyze characteristic information received from the external device and may set each external device as an input device and/or an output device of the application.

There may exist one or more input devices and output devices of the application. Since each external device connected to the device 100 may operate as both an input device and an output device, the device management unit 110 analyzes characteristic information of each external device and sets an input/output device of the application. As described above with reference to FIG. 8, the device management unit 110 may analyze a basic setting value and whether various input/output devices are supported based on the characteristic information.

Also, the device management unit 110 distributes functions of the application that is executed in the device 100 to the external device. That is, the device management unit 110 may distribute various functions of the applications to the external device according to whether the external device is an input device or an output device. When a game application is executed in the device 100 in FIGS. 10A through 10C, the device management unit 110 may distribute a game image reproduction function to a smart TV, an auxiliary image reproduction function to the device 100, and a data input function such as a function of firing a gun to all appcessory devices.

The control unit 120 executes the application along with the external device that is connected to the device 100. That is, when the device management unit 110 connects a new external device to the device 100, the control unit 120 executes the application along with the new external device.

The control unit 120 may execute the application by using information about the input device and the output device set by the device management unit 110. Also, the control unit 120 may execute the application according to the functions of the application that are distributed by the device management unit 110.

Also, separately from the application that is executed, as a new external device is connected, the control unit 120 may execute the found new application. Alternatively, the control unit 120 may execute an application selected by a user input from among the application that is being executed and the new application. Furthermore, the control unit 120 may execute the new application downloaded by the application management unit 130.

The control unit 120 may transmit and receive data used to execute the application to and from the device management unit 110 and the application management unit 130. That is, the control unit 120 may relay various information obtained through the device management unit 110 and the application management unit 130, or may transmit information to the device management unit 110 and the application management unit 130.

The application management unit 130 manages an application that the control unit 120 is to execute. That is, the application management unit 130 may search for a new executable application as a new external device is connected to the device 100. Also, the application management unit 130 may search for a new application by using the characteristic information which the device management unit 110 receives.

The application management unit 130 may search for the application which the control unit 120 is to execute from among applications installed in the device 100. By contrast, the application management unit 130 may search for the application which the control unit 120 is to execute in an external server by using application download information. That is, when a new device is connected and a new application is executed, the application management unit 130 may download the new application by using download information included in the received characteristic information.

Also, as an external device is connected, the application management unit 130 may determine whether a new application is installed in the device 100 or the external device connected to the device 100. That is, when a new device is connected and a new application is found, the application management unit 130 may determine whether the new application is installed in the device 100, and when it is determined that the new application is not installed in the device 100, the application management unit 130 may download the new application. Also, the application management unit 130 may determine whether the new application is installed in an external device connected to the device 100, and when it is determined that the new application is not installed, the application management unit 130 may transmit download information of the new application to the external device.

Figure 14:
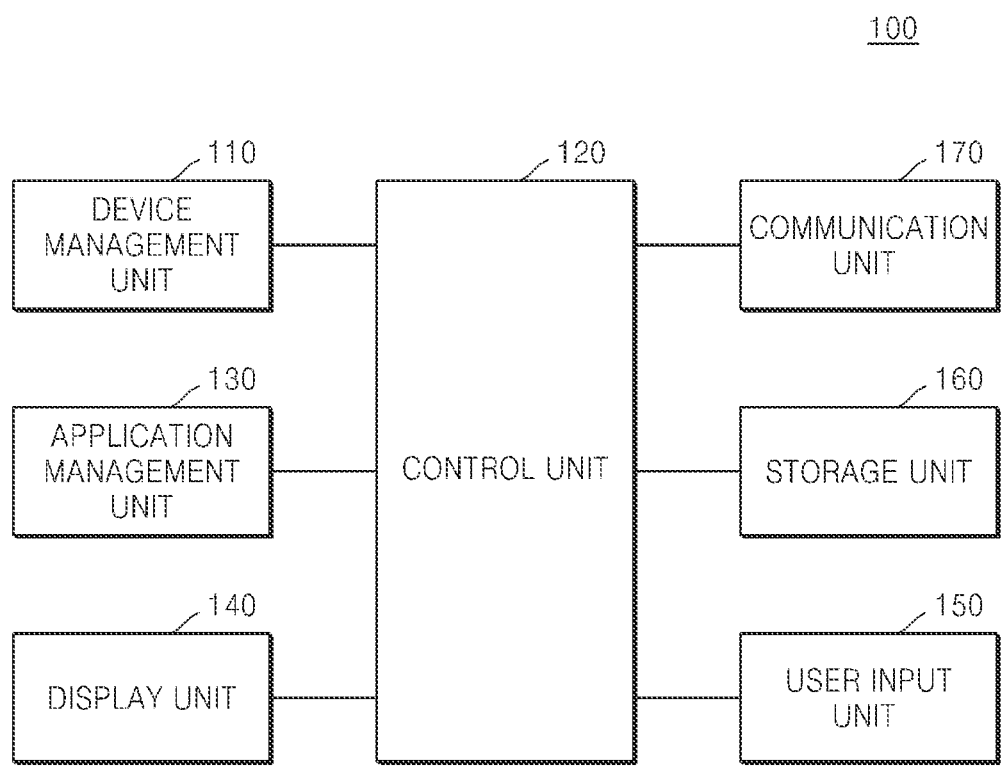
FIG. 14 is a block diagram illustrating the device for executing an application according to another embodiment of the present disclosure.

FIG. 14 is a block diagram illustrating the device 100 for executing an application according to another embodiment of the present disclosure. In FIG. 14, the device 100 may include the device management unit 110, the control unit 120, the application management unit 130, a display unit 140, a user input unit 150, a storage unit 160, and a communication unit 170.

The device management unit 110, the control unit 120, and the application management unit 130 are the same as those described with reference to FIG. 13, and thus a repeated explanation thereof will not be given. The control unit 120 may control the display unit 140, the user input unit 150, the storage unit 150, and the communication unit 170 in addition to the device management unit 110 and the application management unit 130.

The display unit 140 displays on a screen an application that is executed in the device 100. That is, the display unit 140 may display the application that is executed along with external devices that are connected to the device 100. For example, the display unit 140 may display on the screen various types of applications, as shown in FIGS. 8 through 11B. The display unit 140 may divide the screen of the device 100 into two or more areas and may display the application.

Also, the display unit 140 may display the application itself that is executed in the device 100, and when a new application is searched, may also display information about a result of the search. That is, the display unit 140 may display the information about the new application by using a list, or by using various visual effects, such as text, graphics, or a popup window.

The display unit 140 may include at least one of a Liquid Crystal Display (LCD), a Thin Film Transistor (TFT)-LCD, an Organic Light-Emitting Diode (OLED) display, a flexible display, a Three-Dimensional (3D) display, and an electrophoretic display. Two or more display units 1410 may exist according to a type of the device 100.

Also, when the display unit 140 and a touchpad have a layered structure to form a touch screen, the display unit 140 may be used as an input device as well as an output device.

The user input unit 150 is a unit by which the user inputs data for controlling the device 100. That is, the user input unit 150 may receive various types of inputs to control the device 100 and external devices and execute the application from the user.

The user input unit 150 may include a keypad, a dome switch, a touchpad (e.g., a capacitive overlay touchpad, a resistive overlay touchpad, an infrared touchpad, a surface acoustic wave touchpad, an integral strain gauge touchpad, or a piezoelectric touchpad), a jog wheel, or a jog switch. In particular, the touchpad and the display unit 140 may have a layered structure to form a touch screen as described above.

The user input unit 150 may include a remote control device for controlling the device 100 from a long distance. The remote control device may be a remote controller or a separate mobile device having a remote control function (for example, a mobile phone, a smartphone, a tablet PC, or a digital audio player).

Also, the user input unit 150 may include at least one module for receiving data from the user. For example, the user input unit 150 may include a motion recognition module that recognizes the user's motion, a touch recognition module that detects the user's gesture on the touch screen, or a voice recognition module that uses a voice recognition engine.

The storage unit 160 stores various information related to the application. That is, the storage unit 160 may store download information of the application that is executed in the device 100, and may store data input/output in relation to the application.

Also, the storage unit 160 may store connection information or characteristic information of an external device that is connected to the device 100. The connection information or the characteristic information stored in the storage unit 160 may be used when the external device whose connection is terminated is connected again.

The storage unit 160 may include at least one of a flash memory, a hard disc, a multimedia card micro type memory, a card type memory (for example, a Secure Digital (SD) or XD memory), Random Access Memory (RAM), Static Random Access Memory (SRAM), Read-Only Memory (ROM), Electrically Erasable Programmable Read-Only Memory (EEPROM), Programmable Read-Only Memory (PROM) magnetic memory, a magnetic disc, and an optical disc. Also, the device 100 may operate a web storage that performs a storage function on the Internet as the storage unit 160.

The communication unit 170 communicates with the device 100 and an external device (for example, an external device that is connected to the device 100) or an external server (for example, an application download server, a web server, or a cloud server). As described above with reference to FIGS. 1 and 2, the communication unit 170 may communicate with the external device or the external server by using various types of communication technologies, such as Wi-Fi, Bluetooth, BLE, and NFC.

The communication unit 170 may be connected to the external server or the external device in a wired manner by using a communication table or a pin connector, as well as in a wireless manner.

The method of the present disclosure may be implemented as computer instructions that may be executed by various computer means, and recorded on a non-transitory computer-readable recording medium. The non-transitory computer-readable recording medium may include program commands, data files, data structures, or a combination thereof. The program commands recorded on the computer-readable recording medium may be specially designed and constructed for the inventive concept or may be known to and usable by one of ordinary skill in the field of computer software. Examples of the computer-readable medium include storage media such as magnetic media (e.g., hard discs, floppy discs, or magnetic tapes), optical media (e.g., Compact Disc-Read Only Memories (CD-ROMs) or Digital Versatile Discs (DVDs)), magneto-optical media (e.g., floptical discs), and hardware devices that are specially configured to store and carry out program commands (e.g., ROMs, RAMs, or flash memories). Examples of the program commands include a high-level language code that may be executed by a computer using an interpreter as well as a machine language code made by a compiler.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a host device to execute an application, the method comprising:
    executing the application along with a first external device that is connected to the host device by distributing at least one function of the application to the first external device;
    connecting a second external device during the execution of the application;
    executing the application along with the first external device and the second external device by distributing at least one function of the application to each of the first external device and the second external device; and
    searching for a new application that is capable of being executed by the host device, the first external device, and the second external device, as the second external device is connected.

2. The method of claim 1, wherein the connecting of the second external device comprises:

searching for the second external device during the execution of the application; and
connecting the found second external device.

3. The method of claim 1, further comprising:
determining whether the connected second external device is capable of executing the application,
wherein the executing of the application along with the first external device and the second external device comprises executing the application based on a result of the determination.

4. The method of claim 1, wherein the characteristic information of the first external device and the second external device is obtained from each of the first external device and the second external device.

5. The method of claim 4, wherein the characteristic information comprises at least one of information about whether each of the first external device and the second external device supports an input device, or whether each of the first external device and the second external device supports an output device, a screen size, a basic setting value of the input/output device, a category, or a device IDentifier (ID).

6. The method of claim 4, wherein the executing of the application based on the characteristic information comprises dividing a plurality of functions provided by the application to the host device, the first external device, and the second external device based on the characteristic information.

7. The method of claim 1, wherein the executing of the host device along with the first external device and the second external device comprises:
setting at least one of the host device, the first external device, or the second external device as an input device of the application; and
setting at least one of the host device, the first external device, or the second external device as an output device of the application.

8. The method of claim 7, wherein the input device and the output device are set based on the characteristic information of the first external device and the second external device.

9. The method of claim 1, wherein the executing of the application along with the first external device and the second external device comprises executing the found new application along with the first external device and the second external device.

10. The method of claim 1, wherein the executing of the application along with the first external device and the second external device comprises executing an application selected by a user input from among the application that is being executed and the new application.

11. The method of claim 1, wherein the executing of the application along with the first external device and the second external device comprises:
determining whether the new application is installed in the first external device and the second external device; and
transmitting download information of the new application to a device in which the new application is not installed from among the first external device and the second external device.

12. The method of claim 1, wherein the executing of the application along with the first external device and the second external device comprises:
determining whether the new application is installed in the host device; and
downloading, when it is determined that the new application is not installed in the host device, the new application.

13. The method of claim 12, wherein the downloading of the new application comprises downloading download information of the new application which is received from the first external device or the second external device.

14. The method of claim 1, wherein the executing of the application along with the first external device and the second external device comprises executing the application based on at least one of the host device or the first external device to which the second external device is connected.

15. A non-transitory computer-readable recording medium having embodied thereon a program for executing the method of claim 1.

16. A method performed by a first external device to execute an application, the method comprising:
connecting a host device configured to execute the application with a second external device;
executing, as the host device is connected, the application along with the second external device and the host device by distributing at least one function of the application to each of the second external device and the host device; and
searching for a new application that is capable of being executed by the host device, the first external device, and the second external device, as the host device is connected.

17. A host device for executing an application, the host device comprising:
a controller, implemented as hardware, configured to execute the application along with a first external device that is connected to the host device by distributing at least one function of the application to the first external device; and
a host device manager, implemented as hardware, configured to connect a second external device to the host device during the execution of the application,
wherein the controller is further configured to search for a new application that is capable of being executed by the host device, the first external device, and the second external device, as the second external device is connected.

18. The host device of claim 17, wherein the host device manager is further configured to:
search for the second external device during the execution of the application, and
connect the found second external device.

19. The host device of claim 17,
wherein the host device manager is further configured to determine whether the connected second external device is capable of executing the application, and
wherein the controller is further configured to execute the application based on a result of the determination.

20. The host device of claim 17, wherein the characteristic information of the first external device and the second external device is obtained from each of the first external device and the second external device.

21. The host device of claim 20, wherein the characteristic information comprises at least one of information about whether each of the first external device and the second external device supports an input device, or whether each of the first external device and the second external device supports an output device, a screen size, a basic setting value for the input/output device, a category, or a device IDentifier (ID).

22. The host device of claim 17, wherein the host device manager is further configured to distribute a plurality of functions provided by the application to the host device, the first external device, and the second external device based on the characteristic information.

23. The host device of claim 17, wherein the host device manager is further configured to:
set at least one of the host device, the first external device, or the second external device as an input device of the application, and
set at least one of the host device, the first external device, or the second external device as an output device of the application.

24. The host device of claim 23, wherein the input device and the output device are set based on the characteristic information of the first external device and the second external device.

25. The host device of claim 17, wherein the controller is further configured to execute the found new application along with the first external device and the second external device.

26. The host device of claim 17, wherein the controller is further configured to execute an application selected by a user input from among the application that is being executed and the new application.

27. The host device of claim 17, wherein the controller is further configured to:
determine whether the new application is installed in the first external device and the second external device, and
transmit download information of the new application to a host device in which the new application is not installed from among the first external device and the second external device.

28. The host device of claim 17, wherein the controller is further configured to:
determine whether the new application is installed in the host device, and
when it is determined that the new application is not installed in the host device, download the new application.

29. The host device of claim 28, wherein the controller is further configured to download the new application by using download information of the new application which is received from the first external device or the second external device.

30. The host device of claim 17, wherein the controller is further configured to execute the application based on at least one of the host device or the first external device to which the second external device is connected.

31. A first external device for executing an application, the first external device comprising:
a device manager, implemented as hardware, configured to connect a host device that executes the application along with a second external device; and
a controller, implemented as hardware, that, as the host device is connected, is configured to execute the application along with the second external device by distributing at least one function of the application to each of the second external device and the host device and search for a new application that is capable of being executed by the host device, the first external device, and the second external device.

32. A method of executing an application, the method comprising:
executing the application along with a first external device that is connected to a host device, wherein the executing is performed by the host device by distributing at least one function of the application to the first external device;
connecting to at least one of the host device or the first external device during the execution of the application, wherein the communication connection is performed by a second external device;
executing the application based on a first user input received from the first external device and a second user input received from the second external device by distributing at least one function of the application to each of the first external device and the second external device; and
searching for a new application that is capable of being executed by the host device, the first external device, and the second external device, as the second external device is connected,
wherein the executing of the application is performed by the host device, the first external device, and the second external device.

\* \* \* \* \*